June 6, 1961
G. BONMARTINI
2,987,332
RESILIENT TORQUE-TRANSMITTING HINGE STRUCTURE
Filed Nov. 13, 1959
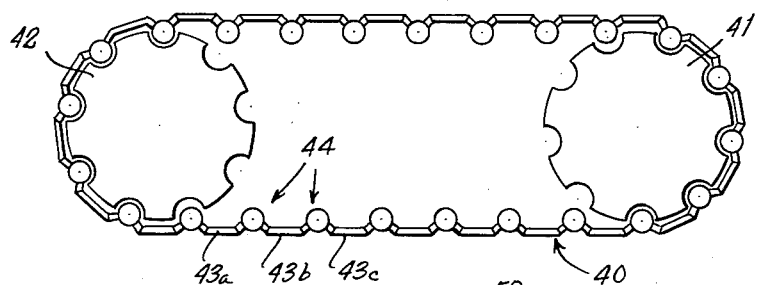
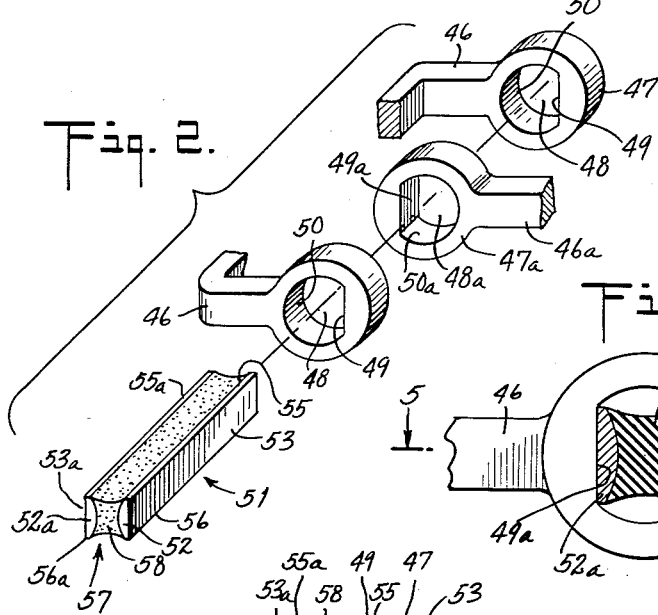
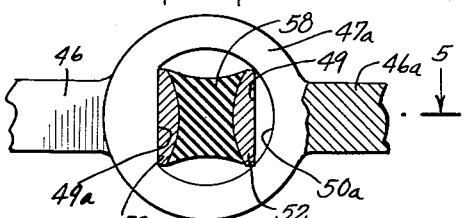
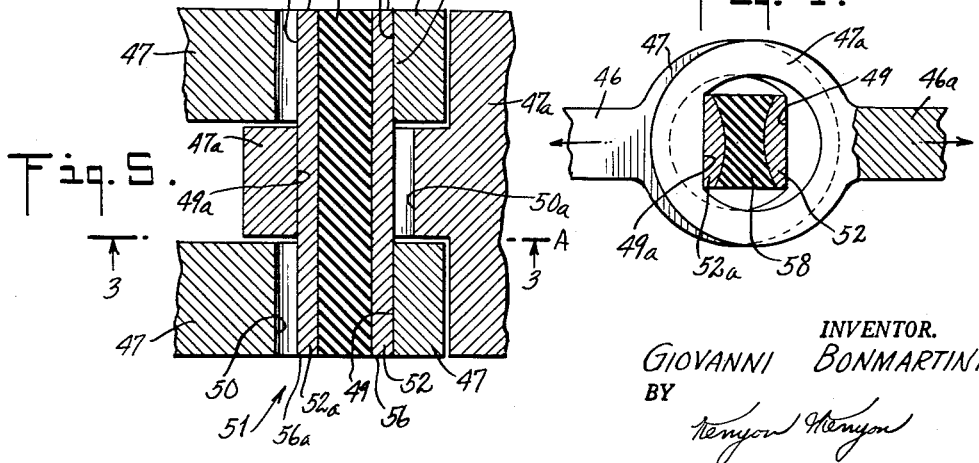
INVENTOR.
GIOVANNI BONMARTINI
BY
Kenyon & Kenyon
ATTORNEYS

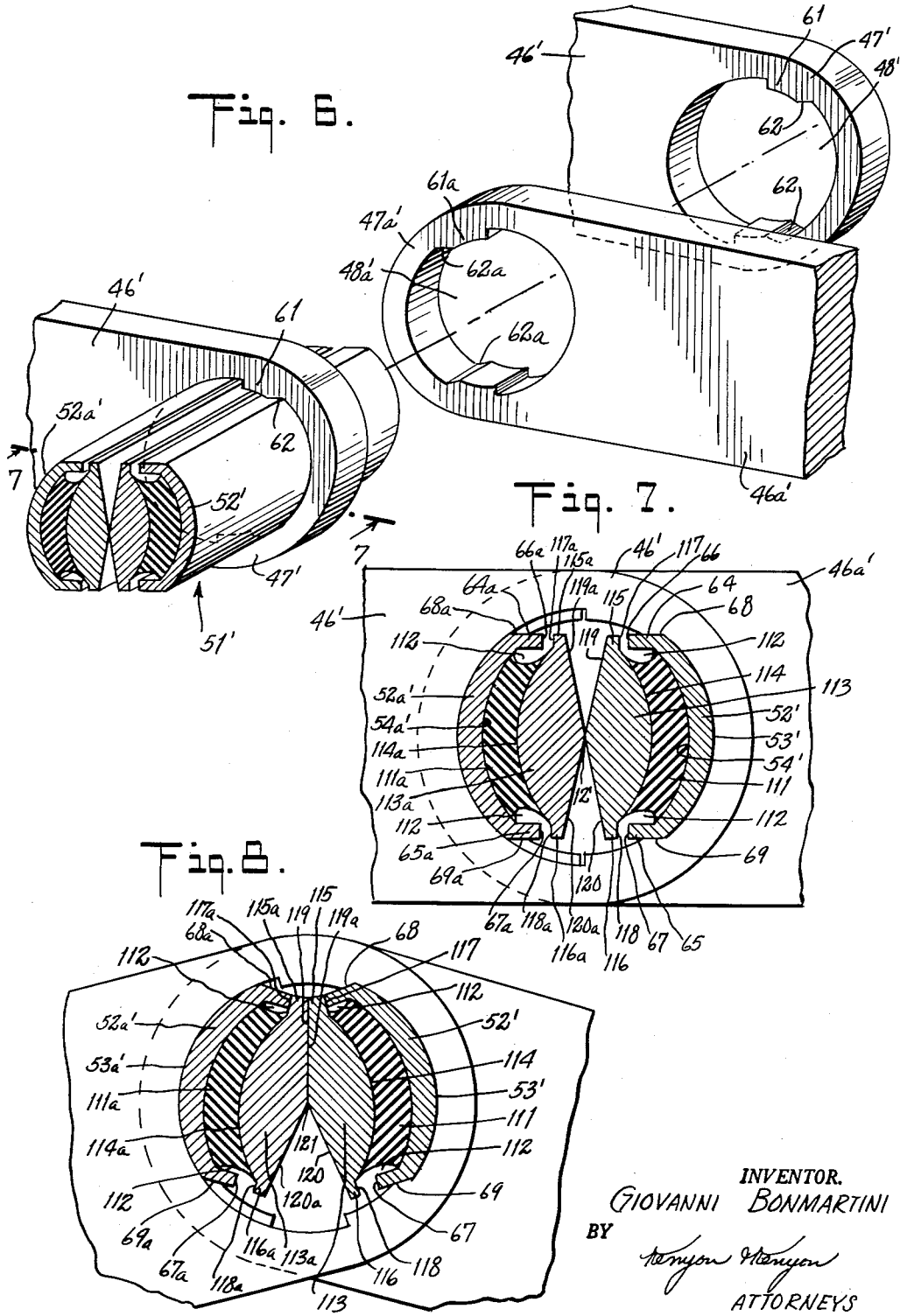

June 6, 1961  G. BONMARTINI  2,987,332
RESILIENT TORQUE-TRANSMITTING HINGE STRUCTURE
Filed Nov. 13, 1959  6 Sheets-Sheet 3

INVENTOR.
GIOVANNI BONMARTINI
BY
Kenyon & Kenyon
ATTORNEYS

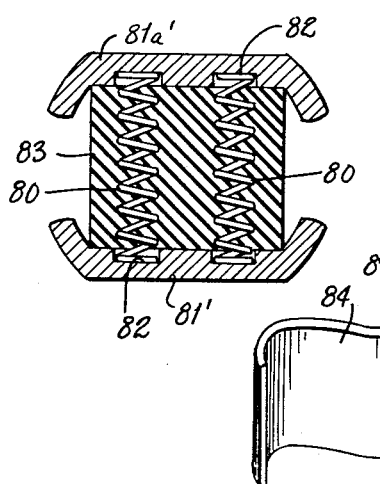
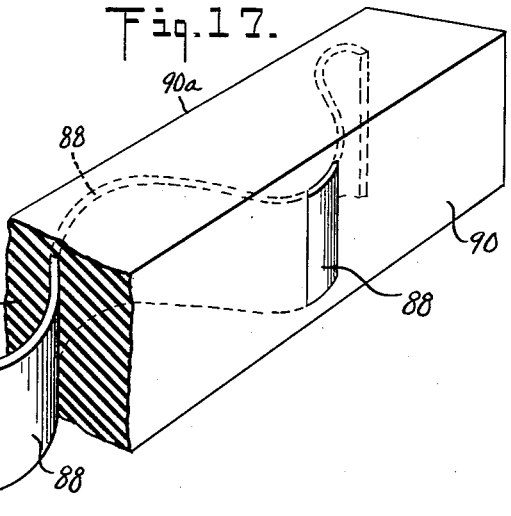
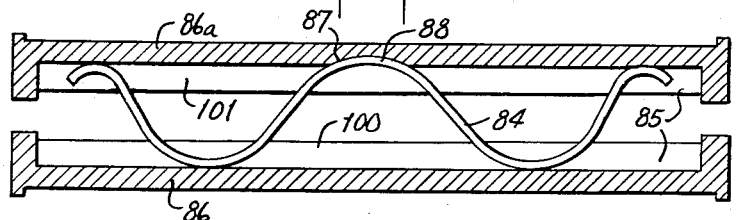
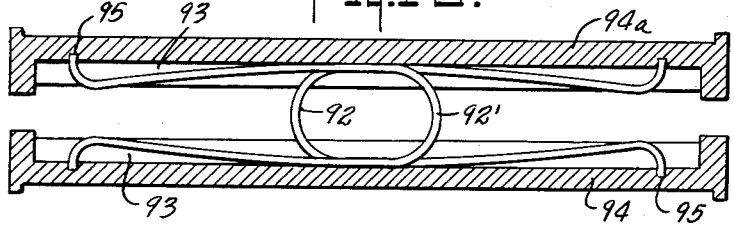
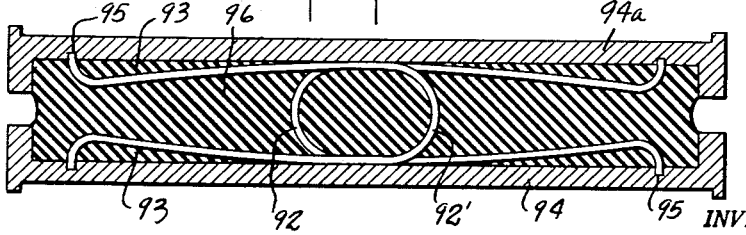

June 6, 1961 G. BONMARTINI 2,987,332
RESILIENT TORQUE-TRANSMITTING HINGE STRUCTURE
Filed Nov. 13, 1959 6 Sheets-Sheet 5
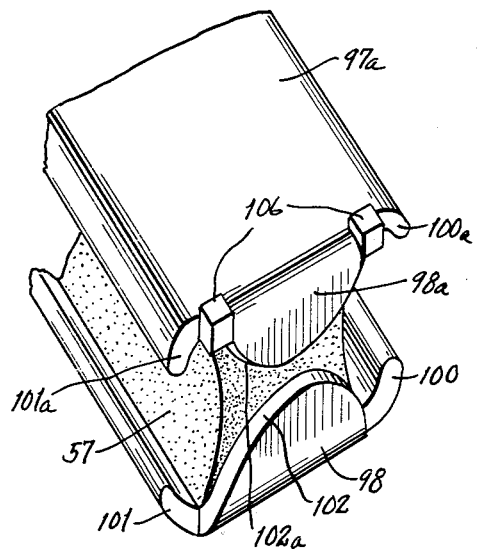
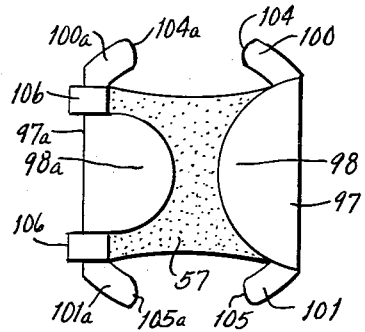
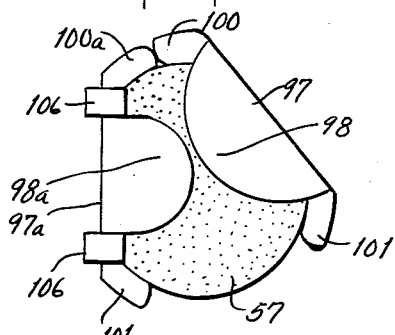
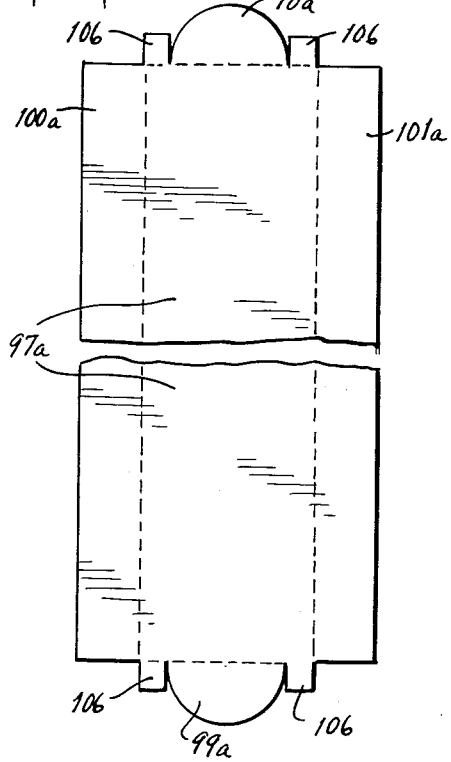
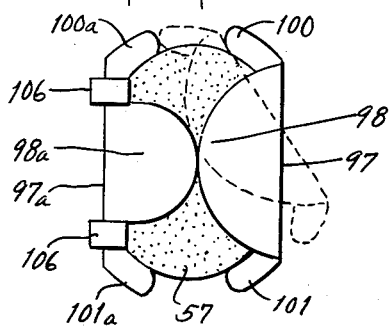
INVENTOR.
GIOVANNI BONMARTINI
BY
ATTORNEYS

INVENTOR.
GIOVANNI BONMARTINI
BY
ATTORNEYS

United States Patent Office 2,987,332
Patented June 6, 1961

2,987,332
RESILIENT TORQUE-TRANSMITTING
HINGE STRUCTURE
Giovanni Bonmartini, 2 Via S. Teodoro, Rome, Italy
Filed Nov. 13, 1959, Ser. No. 852,799
Claims priority, application Italy Nov. 17, 1958
15 Claims. (Cl. 287—85)

This invention relates to a hinge structure and more particularly to such a structure in which there is greatly reduced sliding friction and wear when the hinge is under tension, in which shocks are absorbed by a resilient cushion forming a part of the pintle, and which is capable of limiting the degree of relative rotation between the hinge arms.

The invention may be incorporated in a simple sturdy structure conveniently manufactured without precision machining, and assembled either initially or in rebuilding or repair without difficulty or complex equipment.

The hinge structure of this invention is adapted to many uses. Its strength and simplicity enable it to be used with particular advantage to join the tread units of a Caterpillar track.

In general, a complete hinge embodying this invention includes two hinge arms, each attached to one or more hinge knuckles each of which substantially surrounds an axis common to all the knuckles. The pintle comprises at least two rigid bars, and between them an elastic or resilient medium, especially adapted or suited to resist compressive loads. There are means rigid with at least one knuckle attached to one arm, and one knuckle attached to the other arm, for holding one of said rigid bars and for moving at least part thereof towards the other bar, and thus to compress the elastic medium between them, when there is relative rotation between the hinge arms.

In usual operation, as the hinge arms rotate relative to each other, the rigid bars move closer together along one edge to further compress the elastic medium along that side of the pintle. Each rigid bar may be shaped to provide stops which meet those of the other bar to limit the rotation of the hinge arms or the compression of the elastic medium.

The invention is herein described, for illustration and without limitation, by reference to specific embodiments shown in the accompanying drawings wherein:

FIGURE 1 is a side elevation of a Caterpillar track engaged with two supporting wheels, one or both of which may be powered from a source not shown.

FIGURE 2 is an exploded perspective and diagrammatic representation of three knuckles and a pintle according to the present invention, showing more particularly one method of holding the pintle pieces in position relative to their respective knuckles.

FIGURE 3 is vertical section in a plane at right angles to the axis of the pintle of the hinge of FIGURE 2. This figure is taken in the plane 3—3 of FIGURE 5.

FIGURE 4 is the section of FIGURE 3 showing the knuckles displaced by hinge tension.

FIGURE 5 is a horizontal section in a plane containing the axis of the pintle of a hinge according to this invention. The section is in the plane 5—5 of FIGURE 3.

FIGURE 6 is an exploded perspective and diagrammatic representation of another three knuckles and a pintle according to the present invention, showing more particularly a modified method of holding the pintle pieces in position relative to their respective knuckles.

FIGURE 7 is an end sectional view of the pintle of FIGURE 6.

FIGURE 8 is an end sectional view of the knuckles of FIGURE 6 and a modified pintle rotated to the maximum limit in one direction for a particular tension on the hinge structure.

FIGURE 15 is an end sectional view of a modified pintle suitable for the knuckles shown in FIGURE 2 and similar to that shown in FIGURE 14.

FIGURE 16 is a side sectional view of a modified pintle suitable for the knuckles shown in FIGURE 2.

FIGURE 17 is a perspective and partial sectional view of a modified pintle suitable for the knuckles of FIGURE 2 and similar to that shown in FIGURE 16.

FIGURE 18 is a side sectional view of a modified pintle suitable for the knuckles shown in FIGURE 2.

FIGURE 19 is a side sectional view of a modified pintle suitable for the knuckles shown in FIGURE 2, similar to that of FIGURE 18.

FIGURE 20 is a perspective view of a modified pintle suitable for the knuckles shown in FIGURE 2.

FIGURE 21 is an end elevation of the pintle of FIGURE 20.

FIGURE 22 is an end elevation of the pintle of FIGURE 20 twisted to the approximate limit of rotation in one direction.

FIGURE 23 is an end elevation of the pintle of FIGURE 20 compressed to the maximum limit by hinge tension.

FIGURE 24 is plan view of a flat metal stamping of a rigid bar of the pintle shown in FIGURE 20.

Figure 9:
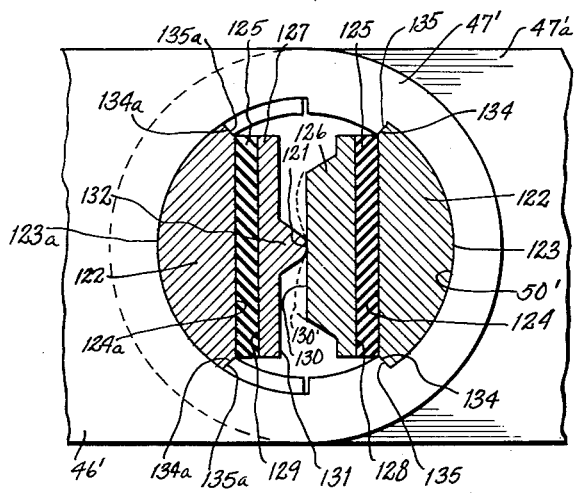
FIGURE 9 is an end sectional view of knuckles as shown in FIGURE 6 and a modified pintle.

Referring to the foregoing drawings:

FIGURE 1 shows a Caterpillar tread 40 mounted on wheels 41 and 42. The tread consists of a plurality of tread units 43a, 43b, 43c, etc., which are interconnected by the hinge structure 44 of the present invention.

Referring to FIGURE 2, which illustrates one preferred embodiment of the invention, the outer hinge parts consist of arm portions 46 and 46a attached to knuckles 47 and 47a. The arm portions 46 and 46a may be adapted to mount the hinge structure 44 in many different applications, and in one preferred embodiment, may be integral with Caterpillar track units 43.

The knuckles 48 and 48a are adapted to receive a pintle 51 coaxially through their openings 48 and 48a, and to be relatively rotatable about what is substantially a common axis.

The knuckle openings 48 and 48a have a cylindrical shape except for means rigid with the knuckles for holding and moving the pintle which may be a flat land 49 and 49a which lies generally along the wall 50 or 50a of opening 48 or 48a opposite the arm of the knuckle. The flat land of each knuckle connected to the same arm lies in the same plane and all are usually dimensioned to match an outside surface 53 or 53a of a rigid bar 52 or 52a of the pintle 51. One preferred form of the pintle is generally a rectangular prism which has as a cross section the largest square than can be inscribed in the openings 48 and 48a.

Referring to FIGURES 2–5, the basic or simplest pintle 51 is comprised of two elongated rigid bars 52 and 52a which embrace between them an elongated body or means 57 of resilient material such as rubber 58. The outside surfaces 53 and 53a of bars 52 and 52a are flat and parallel so that the assembled pintle 51 may be inserted through the openings 48 and 48a of knuckles 47 and 47a. In place, the compressed resilient material 57 urges each bar's side surface 53 or 53a against the flat lands 49 or 49a of the knuckles attached to each arm, so that rotation of an arm, knuckle and flat land will also rotate one of the rigid bars.

An alternative embodiment of the invention is illustrated in FIGURE 6. Arms 46' and 46a' are attached to knuckles 47' and 47a' but openings 48' and 48a' are modified to replace lands 49 and 49a of the knuckles 47 and 47a shown in FIGURE 2 (designed to coact with the outside surfaces 53 and 53a of rigid pintle bars 52 and 52a) with shaped portions of the knuckles which may be flat lands 62 and 62a (designed to coact with the top and bottom edges 55' and 56', or 55a' and 56a' of rigid pintle bars 52' and 52a'). The flat lands of each knuckle are parallel to each other and are normally spaced apart along the side of the openings 48' and 48a' generally opposite to the arm of the knuckle by a dimension perpendicular to the faces equal to the length of a side of the largest square that can be inscribed inside the cylindrical openings 48' and 48a'. The shape of the abutments 61 and 61a supporting the flat lands 62 and 62a is immaterial so long as it is sturdy and is not so extensive as to interfere with the operation of the opposite pintle bar throughout the desired freedom of angular rotation for the arms of the hinge structure.

Knuckles 47' and 47a' generally will receive and hold pintles 51 previously described and designed primarily for knuckles 47 and 47a. But they are particularly adapted to receive and hold pintles 51'. Referring to FIGURE 7, taken generally along the line 7—7 of FIGURE 6, rigid bar pieces 52' and 52a' are shaped along their parallel outside surfaces 53' and 53a' to fit against the inside surfaces 50' and 50a' of the cylindrical openings 48' and 48a' in the knuckles 47' and 47a'. On each edge of the rigid bars 52' and 52a' a rib 64 and 65, and 64a and 65a is formed. The outer surfaces 68 and 69, or 68a and 69a of the ribs attached to the same rigid bar are parallel and spaced apart to fit snugly between the flats 62 or 62a of the knuckles of one arm 47' or 47a'.

The entire space between the inner surface 54' and 54a' of the rigid bars 52' and 52a' can be filled with a resilient material in a manner similar to that illustrated by pintle 51 of FIGURE 2.

Figure 10:
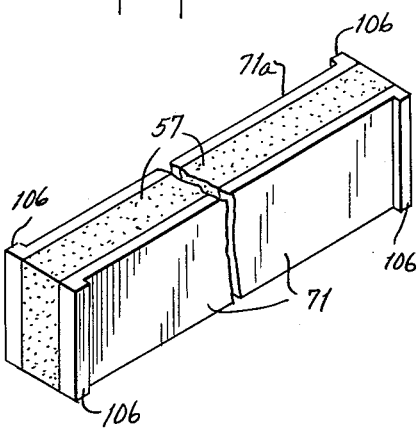
FIGURE 10 is a perspective view of a modified pintle suitable for the knuckles shown in FIGURE 2.

The bars 52 and 52a or 52' and 52a' are preferably made of a relatively stiff material having a modulus of elasticity on the order of that of hardened or at least a tough grade of steel, at least when the hinge structure is used to interconnect the treads 43 of a Caterpillar tread 40. But for many uses both somewhat softer and more elastic stiff materials are suitable. For example, FIGURE 10 illustrates the use of a relatively hard or inelastic rubber-like material 71 to form the rigid bars, which is appropriate even for a resilient member comprising steel springs, although generally used with a soft rubber.

The resilient member 57 is preferably made of a relatively elastic material having a modulus of elasticity on the order of that of rubber. Examples are neoprene and a wide variety of natural and synthetic polymeric materials. Optionally metallic springs may be added, or may replace the rubber altogether as hereinafter disclosed.

Figure 11:
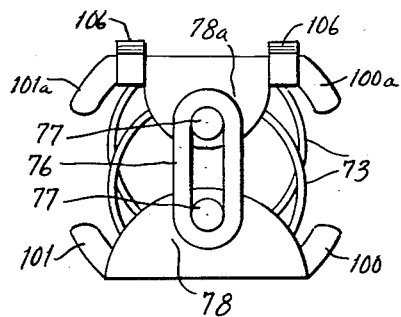
FIGURE 11 is an end view of a modified pintle suitable for the knuckles shown in FIGURE 2.
Figure 12:
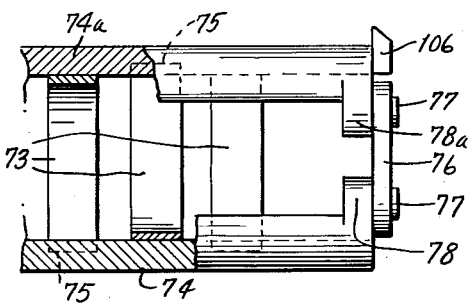
FIGURE 12 is a side partial sectional view of the pintle of FIGURE 11.
Figure 13:
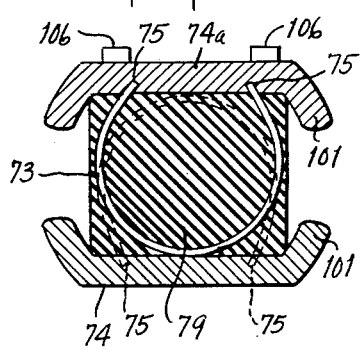
FIGURE 13 is an end sectional view of a pintle suitable for the knuckles shown in FIGURE 2 and similar to that shown in FIGURES 11 and 12.

For example, FIGURE 11 shows semi-circular leaf springs 73 which may be fixed in position by seating their ends in slots or pockets 75 spaced appropriately along the length of the rigid bar pieces 74 and 74a. This and other pintles may be contained as one compact unit for convenience of handling or inserting the pintle into the knuckle opening. For example, retaining rings 76 may be fitted over pins 77 mounted on tongues 78 at each end of the rigid bars. FIGURE 12 shows a partial sectional and side view of the same structure, and FIGURE 13 illustrates in cross section its combination with a rubber-like resilient member 79.

Figure 14:
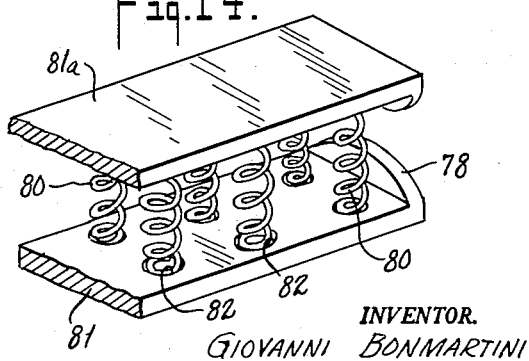
FIGURE 14 is a perspective view of a modified pintle suitable for the knuckles shown in FIGURE 2.

FIGURE 14 shows the use of a series of coil springs 80 appropriately spaced between rigid or stiff pieces 81 and 81a as necessary to withstand the compressive loads, and held in position by appropriately spaced recesses or pockets 82 in the inner surfaces of the rigid bar pieces. FIGURE 15, illustrates a similar coil spring member combined with a rubber-like resilient substance 83.

The resilient material may also be a leaf spring member 84 having a sinusoidal shape and retained in recesses 85 located on the inner surfaces rigid members 86 and 86a as shown in FIGURE 16. The spring may be held in the center of the recess 85 by a transverse channel 87 located in the inner face of a bar, for example, 86a, which is positioned and shaped to receive an appropriate apex 88 of the leaf spring. This sinusoidal spring shape is especially suited for some applications because of the concentration of spring force toward the center of the rigid bar pieces 86 and 86a.

FIGURE 17 illustrates adaptation to combine and embed a spring 84, similar to that shown in FIGURE 16, in a rubber-like material 89. The apexes 88 of the sinusoidal spring 84 preferably project slightly from the surfaces 90 and 90a of the rubber-like material 89 to contact the inner face of the rigid bar members which are parallel to the surfaces 90 and 90a of the resilient member, but are not shown. This projection is ordinarily desirable since as the spring 84 is compressed (or relaxed) its apexes 88 move longitudinally along the axis of the hinge structure to be further apart (or closer together) and hence ordinarily experience some sliding motion along the inner face of the rigid bar members which may best be borne by a hard metal surface of the spring.

FIGURE 18 shows a resilient member comprising a set of coiled spring members 92 and 92' located in retaining recess 93 or recesses 93 and 93' of rigid bar members 94 and 94a. The spring is positioned along the recess by inserting its ends in pockets 95 located within the recesses. The coiled springs 92 and 92' may be embedded in a rubber-like resilient member 96 as shown in FIGURE 19.

A rubber-like resilient member which may be reinforced by embedded fabric, fibre, or spring, may also be held in place against the inner surface of the rigid bars by any appropriate conventional method. For example, it may ordinarily be joined by adhesive, or even held by friction as, it is compressed against the inner bar surfaces. It may ordinarily also be held mechanically by a shaped rigid bar. As shown in FIGURES 20–23, the bars 97 and 97a can be shaped to enclose and cradle the resilient means 57 between a tongue projection and side rib or lip projections 100, 101, 100a, 101a. Similarly, a resilient member may be partially retained and protected by the rigid bars illustrated in FIGURE 7 between the ribs 64, 65, and 64a, 65a.

The elastic operation of the pintles will generally be improved and the pintle more securely retained within the knuckle openings if the pintle always operates under some compressive load over its entire surface. It is usually particularly desirable to avoid placing tension upon a rubber-like, elastic or resilient member. This can usually be best accomplished by designing and dimensioning the resilient member so that the pintle must be precompressed sufficiently to be in the knuckle openings to insure that no portion is entirely uncompressed regardless of the degree of rotation permitted or experienced by the hinge structure.

Resilient members which are comprised primarily of rubber or rubber-like substance may also be dissimmetrically shaped.

Figure 25:
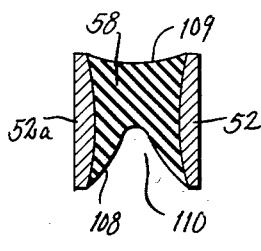
FIGURE 25 is a cross section of another modified pintle suitable for the knuckles shown in FIGURE 2.

As shown in FIGURE 25, for example, the resilient rubber-like material 58 sandwiched between rigid bars 52 and 52a is shaped with a deep concave pocket 108 and a shallow concave pocket 109. In operation, the arms may rotate to compress the resilient material at its top thick portion 109 without placing substantial tension on the material on the bottom 110. However, in some cases it may be convenient to operate the arms in the opposite direction since then the concave pockets 108 greatly weaken the resistance provided by the resilient material 57 to rotation in this direction, while the normally contoured material at the opposite side 109 of the pintle remains susceptible of being placed under tension.

In operation, the pintles eliminate the increase of sliding friction and wear that normally occurs when the hinge is put under tension. Referring to FIGURE 3, this friction ordinarily takes place between a knuckle, e.g. 47, and a pin or solid one piece pintle (not shown) at the inside surface, e.g. 50, of the knuckle opposite the arm, e.g. 46, which transmits the tension. In the hinge structure embodying this invention, relative movement between the knuckle and pintle at this point is eliminated—instead flat land 49 contacts the pintle bar outer surface 30 and coacts with pressure transmitted through the resilient means from the other pintle bar to hold it so that associated knuckle and pintle bar move together in the area where maximum friction would ordinarily be encountered, when the arms are rotated relative to one another.

Likewise the pintle illustrated in FIGURE 7 also eliminates the sliding friction between the inner surface of the knuckles, e.g. 50′, and the outside surface of the pintle bar, e.g. 53′, at the critical area substantially opposite the hinge arms, to move together, since knuckle and pintle bar are held there by flat lands, e.g. 62.

In the pintle illustrated in FIGURE 2, the relative motion between knuckles attached to different arms is absorbed in the resilient member itself. As shown in FIGURE 22, that member may accomplish this generally compressing in the half adjacent one edge, and expanding in the half adjacent the other edge.

The relative movement between the knuckles and pintle bars to which each is attached is converted by the embodiment of the invention shown in FIGURE 7 to a rolling contact between two surfaces. In the pintle bar of that figure, an elongated resilient member 111, which may be, for example, a rubber-like substance, is located adjacent the inner surfaces 54′ and 54a′ of the pintle bars 52′ and 52a′. This resilient member is shaped away from the rigid bar's end ribs 64, 65 and 64a, 65a to leave pockets 112 into which it can expand when compressed. Central rigid or stiff members 113 and 113a are placed to have an outer surface 114 adjacent the inner surface of the resilient member. The two central rigid members have inner surfaces 119, 120 and 119a, 120a which meet or engage, normally at the center 121.

FIGURE 9 illustrates another preferred form of the pintle in which the pintle bars 122 and 122a are shaped along their outside surfaces 123 and 123a to be adjacent to the inner surfaces 50′ and 50a′ of knuckles 47′ and 47a′. A resilient material 125 is sandwiched between the flat inner surfaces 124 and 124a of these bars and the flat outer surfaces 128 and 129 of the central rigid members 126 and 127. This pintle has certain economies of manufacture and increases the compressive load carrying capacity or working life of some elastic materials.

The pintle bars 122 and 122a are shaped along their edges 135 and 135a to be adjacent to the radial indentations 134 and 134a of knuckles 47′ and 47a′.

The inner surfaces 130 and 131 of central rigid members 126 and 127 of the pintle shown in FIGURE 9 illustrate one of the many possible embodiments of the invention. The surface 130 of the member 126 may be either flat or, as shown by the dotted line 130′, have a shallow channel along the center. Either the flat surface or channel is adapted to coact with the rib 132 of central rigid piece 127.

The tension applied to the hinge structure—by the Caterpillar tread in which it is used, for example—may be evened and the shocks absorbed by the pintle, as shown in FIGURE 4. As the resilient pintle 51 receives a compressive load from tension applied to the hinge arms 46 and 46a, which is greater than its normal precompression in the knuckle openings, it compresses further to allow the knuckles 47 and 47a to move away from each other at right angles to the hinge axis of rotation.

This displacement in a small degree is generally desirable, since it displaces the outside faces 53 and 53a of the rigid bars 52 and 52a away from the inside surfaces 50a and 50 of the knuckle openings to even further reduce the sliding friction which might otherwise be present, at least at the outside of the top and bottom edges, 55, 56, 55a and 56a.

In the simple pintle 51 of FIGURE 2, the degree of displacement of the knuckles and pintle bars due to this tension on the hinge structure is limited only by the compressed resilient material 55. The displacement may also be controlled for operational purposes and to prevent injury to the resilient material by various stop means.

One preferred means is illustrated in FIGURE 23. The rigid bars 97 and 97a are provided at each end with an arch-shaped tongue 98, 99 and 98a and 99a. The opposite inside surfaces 102 and 102a of the tongues 98 and 98a at one end of the pintle are located so that they will contact when the resilient member 57 has been compressed to the maximum extent desired. The curvature of the inside arch surfaces is designed so that this limit is not exceeded regardless of angle of rotation of the hinge arms 46 and 46a and pintle bars 98, 99, 98a, 99a at the time the tension is experienced by the pintle.

Another preferred form of stop is illustrated in FIGURE 7. Ribs 65 and 66 formed at each side along the length of the rigid bar 52 project inward toward opposite ribs 65a and 66a formed along bar 52a. Between them are edge ribs 115, 116 and 115a, 116a of central rigid member 113 and 113a. When the hinge is not experiencing a nearly maximum rotation, these central rigid members are in contact at their apex 121 and the compression of the resilient material 111 and 111a is limited by the meeting of the end surfaces 66, 67, and 66a, 67a of the pintle bar ribs and the outer rib surfaces 117, 118 and 117a, 118a of central rigid pieces 113 and 113a which are held apart at 121. When nearly maximum rotation is being experienced by the hinge, the central rigid pieces 113 and 113a contact either along surfaces 119 and 119a or 120 and 120a.

Both the maximum rotation which the hinge structure permits, and the normal position to which the arms of the structure are urged may also be controlled by means of the present invention.

Rotation may be limited in pintle 51, as shown in FIGURE 22, by forming ribs 104, 105 and 104a, 105a along the edges of the rigid bars 97 and 97a. These extend outwardly from the resilient member at a slight angle, and, particularly if it is a rubber or rubber-like substance, the resilient material member itself is slightly concave towards its center to form a shallow pocket 107 into which it can expand when compressed so that it will not interfere with the operation of the rib stops. The ribs facing each other, 104 and 104a or 105 and 105a, are dimensioned to meet and stop the rotation at the desired point, in each direction.

It is apparent from inspection of FIGURE 22, of course, that the precise angle at which the rotation is limited by the rib stops 104 and 104a or 105 and 105a may be slightly affected by the degree of tension which the hinge is experiencing. For example, the maximum rotation permitted under severe tension significantly compressing the resilient member generally as shown in FIGURE 23, will be somewhat less than that indicated in FIGURE 22. But in practice, this variation is usually unimportant.

Another preferred form of stop to limit the hinge rotation is illustrated in FIGURE 8. As is apparent from the drawing, the rotation in one direction is limited as edge rib end surface 66, the edge ribs 115 and 115a of the central rigid members 113 and 113a, and end surface 66a meet, and in the other direction as the analogous parts 67, 116 and 116a and 67a meet.

The pintle may be constructed to control the permitted rotation, for example, to urge the arms to a normal position or to allow free movement until the ultimate limit of rotation is reached or to allow free movement until the ultimate limit of rotation is approached and to then gradually increase the resistance to the rotation.

Figure 26:
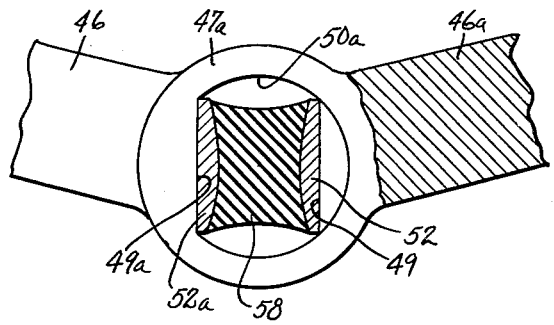
FIGURE 26 is a cross section of a modified knuckle and arm combination and an unmodified pintle of FIGURE 2. The hinge knuckles and arms are assumed to be at the normal position in which the resilient member of the pintle is under uniform compression.

In the simplest pintle structure 51 shown in FIGURE 2, the normal position in which the resilient member 57 is under uniform compression occurs when the knuckle flat lands 49 and 49a are opposite, and, in this example, when the arms 46 and 46a are in the same plane. As they rotate from this plane, the resilient member 57 is put under increasing distorted compression as it is compressed between the pintle bars in one half, for example that adjacent to the top edge 55, and decompressed in the other half, for example that adjacent to the bottom edge 56 so the resistance to rotation gradually increases until the stops are reached. The arms can, of course, be attached to the knuckles so that when the pintle is under uniform compression they occupy any desired normal position—for example, that illustrated in FIGURE 26.

This particular arrangement might be used to interconnect the track tread units 43 illustrated in FIGURE 1 so that the track more easily curves around the wheels 41 and 42, and so that tread units 43 are pressured against the ground.

Figure 27:
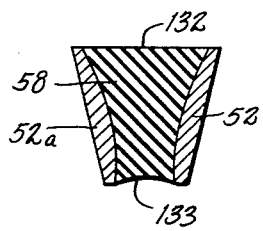
FIGURE 27 is a cross section of another modified pintle suitable for the knuckles shown in FIGURE 2.
Figure 28:
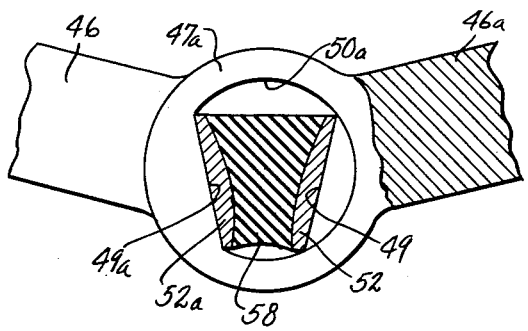
FIGURE 28 is a section at right angles to the axis of the pintle of a hinge structure utilizing the modified pintle of FIGURE 27. In this figure, the hinge knuckles and arms are assumed to be at the normal position in which the resilient member of the pintle is under uniform compression.

Another preferred embodiment is illustrated in FIGURES 27 and 28. The pintle of this embodiment contains a resilient member 58' which is shaped in its relaxed condition to be thicker at one side 132 than the other 133. This configuration can be satisfactorily obtained with many resilient materials, for example, with rubber-like substance, steel springs, or their combination. When this modified pintle is inserted into the normally arranged hinge outer pieces as shown in FIGURE 2, the normal position of the arms 47 and 47a shifts to the position shown in FIGURE 2. The rotation of the arms from this normal position encounters a gradually increasing resistance but, unlike the structure shown in FIGURE 26, the degree of resistance encountered for movement away from the normal position varies depending on the direction in which the rotation takes place. For example, the resistance increases most rapidly when the arms are rotated to compress the narrower side 133 of the resilient member 58'.

Another preferred method for controlling hinge rotation is shown in FIGURE 8 especially adapted for the modified knuckles 47', 47a'. The inner surfaces 119, 120 and 119a, 120a of the central members engage or meet at 121 to allow free rolling contact of the knuckles and arms until a predetermined angular relationship or limit in one direction is approached and opposite surfaces 119 and 119a or 120 and 120a meet. Rotation may then be continued against increasing resistance until the absolute limit is reached when the outer surface 117 and 117a or 118 and 118a of central member edge ribs 115 and 115a or 116 and 116a meet with the end surfaces 66 and 66a or 67 and 67a of the pintle bar edge ribs.

The position and shape of the inner surfaces of the central members can be adapted to control the rotation in many obvious ways. For example, opposite surfaces can be curved as desired to control the degree to which resistance is encountered as the arms are rotated.

Other modifications in the construction may be provided for convenience of operation. For example, referring to FIGURE 20, tabs 106 may be provided to lock the pintle within the openings 48 or 48a of the knuckles 47 and 47a. These tabs with the other portions of the rigid bars 97 and 97a may be conveniently struck from metal, as in the flat stamping shown in FIGURE 9. The tabs may be formed as a lock after the pintle has been inserted in the knuckle openings, or preformed and inserted by compressing the pintle assembly.

I have shown several preferred forms of this invention, but only for purposes of illustration. The invention itself is to be understood as defined in the annexed claims.

What I claim is:

1. In a resilient torque-transmitting hinge structure having at least two knuckles relatively rotatable about a common axis, the combination of a pintle member comprising at least two bars of stiff material adapted to extend parallel to one another and to said common axis through openings in said knuckles and resilient means interposed between said bars adapted to resist compressive forces tending to squeeze said bars together, and means rigid with one of said knuckles for rotating one of said bars about said axis relative to the other bar whereby to compress said resilient means between said bars when one of said knuckles is rotated relative to the other.

2. The combination recited in claim 1 wherein the resilient means consists of a steel spring.

3. The combination recited in claim 1 wherein the resilient means is a metal spring and there are means to secure said spring in place between the bars.

4. The combination recited in claim 1 wherein the bars of stiff material are made of a hard rubber and the resilient means is a soft rubber.

5. In a resilient torque-transmitting hinge structure having at least two knuckles relatively rotatable about a common axis on opposite sides of a plane perpendicular to said axis, the combination of a pintle member comprising two parallel members each formed of a relatively stiff material having a modulous of elasticity on the order of that of steel and secured between said parallel members a layer of relatively elastic material having a modulus of elasticity on the order of that of rubber, said pintle member extending on both sides of the aforementioned plane and penetrating an opening in each of said knuckles, and means rigid with one of said knuckles for rotating one of said parallel members relative to the other parallel member whereby to compress the elastic layer between them when one of said knuckles is rotated relative to the other.

6. The combination recited in claim 5 wherein tongues integral with the ends of each of said parallel members extend adjacent each end of the layer of elastic material, and ribs integral with each lateral edge of the parallel members extend towards each other forming with said members and tongues a cradle wherein the elastic material is received, whereby the elastic material is secured against dislodgement and protected against excessive pressure when the knuckles rotate.

7. The combination recited in claim 5 wherein the layer of elastic material comprises coiled metallic springs embedded in a block of rubber-like material.

8. The combination recited in claim 5 wherein the layer of elastic material comprises spring steel leaves formed in a generally sinusoidal shape and embedded in a block of rubber-like material.

9. The combination recited in claim 5 wherein the parallel members are made of hardened steel and the elastic material is a rubber-like substance.

10. The combination recited in claim 5 including means integral with each of said parallel members for engaging with a lateral surface of said knuckles whereby the pintle is secured against endwise displacement from its position within the openings of said knuckles.

11. In a resilient torque-transmitting hinge structure having at least two knuckles relatively rotatable about a common axis, the combination of a pintle member passing through said knuckles and comprising two inner parallel members and two outer parallel members, each formed of a relatively stiff material having a modulus of elasticity on the order of that of steel, the inner members being adapted to engage and to rock in contact with each other along a line parallel to the common axis of the hinge, and secured between at least one of said inner members and its adjacent outer member a layer of relatively elastic material having a modulus of elasticity on the order of that of rubber, and means including a shaped portion of at least one of said knuckles for rocking said inner members upon each other and for moving said adjacent inner and outer members towards each other to compress the elastic layer between them.

12. The combination recited in claim 11 wherein a rib integral with at least one lateral edge of one of the outer parallel members forms a cradle wherein the elastic material is received, whereby the elastic material is secured against dislodgement and protected against excessive pressure when the knuckles rotate.

13. The combination recited in claim 11 wherein ribs integral with the lateral edges of one of said outer parallel members are adapted to engage with the adjacent inner parallel member, when the knuckles have rotated beyond a predetermined angular relationship, whereby the elastic material between said members is protected against excessive pressure.

14. The combination recited in claim 11 wherein a surface of one of said inner parallel members removed from the common axis of the hinge is adapted to engage a surface of the other of said inner parallel members when the knuckles have rotated beyond a predetermined angular relationship, whereby rotation of said knuckles beyond said predetermined angular relationship is resisted by the resistance to compression of the layer of elastic material between said adjacent inner and outer parallel members.

15. In a resilient torque-transmitting hinge structure having at least two knuckles relatively rotatable about a common axis, the combination of a pintle member comprising at least two bars of stiff material extending parallel to one another and to said common axis through alined openings in said knuckles, resilient means interposed between said bars, and means rigid with one of said knuckles and engaging one of said bars adapted to cause said bar to rotate relative to the other of said bars when the knuckles are rotated relative to said axis, whereby the resilient means is compressed when said knuckles are rotated relative to each other.

References Cited in the file of this patent

UNITED STATES PATENTS

| | | |
|---|---|---|
| 1,443,440 | Spicer et al. | Jan. 30, 1923 |
| 1,772,915 | Roseberg | Aug. 12, 1930 |
| 2,079,460 | Marty | May 4, 1937 |
| 2,158,890 | Antelme | May 16, 1939 |
| 2,208,314 | Snyder | July 16, 1940 |
| 2,257,804 | Lord | Oct. 7, 1941 |
| 2,716,822 | Launder et al. | Sept. 6, 1955 |